(12) United States Patent
Maitre et al.

(10) Patent No.: US 12,720,312 B2
(45) Date of Patent: Aug. 25, 2026

(54) COMPUTER-IMPLEMENTED METHOD FOR CONNECTING A VEHICLE TO A WIRELESS LOCAL NETWORK OF A WORKSHOP

(71) Applicant: Volvo Truck Corporation, Gothenburg (SE)

(72) Inventors: Julien Maitre, Chuzelles (FR); Yann Quibriac, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 550 days.

(21) Appl. No.: 18/100,768

(22) Filed: Jan. 24, 2023

(65) Prior Publication Data

US 2023/0262461 A1 Aug. 17, 2023

(30) Foreign Application Priority Data

Feb. 16, 2022 (EP) .................................... 22156984

(51) Int. Cl.
*H04W 12/08* (2021.01)
*H04W 12/00* (2021.01)
*H04W 76/10* (2018.01)

(52) U.S. Cl.
CPC ......... *H04W 12/08* (2013.01); *H04W 12/009* (2019.01); *H04W 76/10* (2018.02)

(58) Field of Classification Search
CPC ....... H04W 12/04; H04W 4/80; H04W 12/06; H04W 12/08; H04W 84/18; H04W 12/77;
(Continued)

(56) References Cited

U.S. PATENT DOCUMENTS 10,104,547 B1 * 10/2018 Thanayankizil ........ H04W 4/44
11,199,853 B1 12/2021 Afrouzi et al.
(Continued)

FOREIGN PATENT DOCUMENTS

EP 2894931 A1 7/2015
EP 3065466 A1 9/2016
(Continued)

OTHER PUBLICATIONS

Communication Under Rule 71(3) EPC, European Application No. 22156984.1, mailed Mar. 13, 2024, 27 pages.
(Continued)

*Primary Examiner* — Jinsong Hu
*Assistant Examiner* — Justin Barry
(74) *Attorney, Agent, or Firm* — Sage Patent Group

(57) ABSTRACT

A computer-implemented method for connecting a vehicle to a wireless local network of a workshop includes identifying at least one wireless local network configuration of the wireless local network, said wireless local network configuration being associated with credentials for using said wireless local network; associating at least one validity parameter to said credentials in order to allow limited accessibility for the vehicle to said wireless local network; generating an encrypted visual representation of said credentials, thereby enabling the generated encrypted visual representation to be presented to a camera of the vehicle and decrypted to obtain said credentials; upon receipt of a connection request including the credentials from the vehicle, checking the at least one validity parameter to determine that the credentials are still valid for the vehicle; and upon determination that the credentials are still valid, allowing the vehicle to connect to the wireless local network of the workshop.

17 Claims, 3 Drawing Sheets

(58) Field of Classification Search
CPC ............... H04W 12/047; H04W 12/03; G06Q 20/3274; G06Q 20/3276; G06K 7/1417; G06F 21/31; H04L 9/30
See application file for complete search history.

(56) References Cited

U.S. PATENT DOCUMENTS

| | | | | |
|---|---|---|---|---|
| 11,475,230 | B1 * | 10/2022 | Raina .................... | H04W 12/77 |
| 2014/0068727 | A1 | 3/2014 | Shamis et al. | |
| 2014/0282923 | A1 * | 9/2014 | Narayan ............... | H04W 12/50 726/5 |
| 2015/0288682 | A1 * | 10/2015 | Bisroev .................. | G16H 40/20 713/172 |
| 2019/0182666 | A1 * | 6/2019 | Kotay ................... | H04W 76/18 |
| 2020/0169886 | A1 * | 5/2020 | Bhatt .................... | H04W 12/08 |
| 2020/0193749 | A1 | 6/2020 | Link, II et al. | |
| 2021/0168606 | A1 * | 6/2021 | Givens .................... | H04W 4/40 |

FOREIGN PATENT DOCUMENTS

| | | | | |
|---|---|---|---|---|
| JP | 2020145726 | A | * | 9/2020 |
| WO | 2017013854 | A1 | | 1/2017 |

OTHER PUBLICATIONS

Communication Under Rule 71(3) EPC, European Application No. 22156984.1, mailed May 8, 2024, 27 pages.

European Search Report, European Application No. 22156984.1, mailed Jul. 18, 2022, 9 pages.

"Chapter 13: Key Management Techniques ED Menzes A J; Van Oorschot P C; Vanstone S A", Handbook of Applied Cryptography [CRC Press Series on Discrete Mathematices and its Applications], XP001525013, CRC Press, Boca Raton, FL, US, Oct. 1, 1996, 49 pages.

* cited by examiner 420
50
410
430

500
510
520

COMPUTER-IMPLEMENTED METHOD FOR CONNECTING A VEHICLE TO A WIRELESS LOCAL NETWORK OF A WORKSHOP

CROSS REFERENCE TO RELATED APPLICATIONS

This application claims priority to European Patent Application No. 22156984.1, filed on Feb. 16, 2022, the disclosure and content of which is incorporated by reference herein in its entirety.

TECHNICAL FIELD

The present disclosure relates to a computer-implemented method for connecting a vehicle to a wireless local network of a workshop. The present disclosure also relates to a computer program, a computer readable medium and a control unit. The present disclosure further relates to a vehicle.

The teachings of the present disclosure can, for instance, be applied to connecting heavy-duty vehicles to a wireless local network. For instance, the heavy-duty vehicles may be trucks, buses and construction equipment. However, the general inventive concept is not restricted to this particular vehicle, but may also be used in other vehicles such as cars.

BACKGROUND

Today when a vehicle is at a workshop, a communication interface may via a diagnostic cable be connected to a diagnostic connector of the vehicle. The communication interface can, in its turn, communicate with a diagnostic tool through various wired or wireless means. In the future it is envisaged that there will be a demand for communicating wirelessly directly using the equipment of the vehicle (e.g., Wi-Fi equipment of the vehicle), without needing to physically connect an intermediate communication interface. While the communication has historically been mostly between the vehicle and the diagnostic tool (via said physically connected communication interface), the direct communication may enable communication between many kinds of tools in the workshop or even with servers outside the workshop.

However, in privately owned workshops where the identities of wireless networks (such as the SSIDs) may vary from one workshop to another (or may even vary within the same workshop between two visits), it will be difficult for a vehicle to find a valid wireless network. Even if a valid wireless network is found, the vehicle will not have the corresponding credentials. The credentials are owned by the workshop and are sensitive data. Thus, the workshop owner may be reluctant to distribute the credentials in an uncontrolled manner.

SUMMARY

An object of the present disclosure is to provide a method for connecting a vehicle to a wireless local network of a workshop, which method at least partly mitigates the drawbacks of the prior art. This and other objects which will become apparent in the following disclosure are accomplished by a computer-implemented method according to claim 1. Some non-limiting exemplary embodiments are presented in the dependent claims.

The inventors have realized that by setting a limited validity of the credentials for a particular vehicle, and making the credentials with such limitations available to the vehicle in a secure manner, the workshop may maintain appropriate control over its sensitive data while facilitating the connection of that particular vehicle to the wireless network of the workshop, thereby making it possible to smoothly and efficiently diagnose the vehicle when it is taken in for, for example, repair or maintenance purposes. This will now be discussed in more detail with reference to a first aspect of the present disclosure.

According to a first aspect of the present disclosure, there is provided a computer-implemented method for connecting a vehicle to a wireless local network of a workshop, comprising:

- identifying at least one wireless local network configuration of the wireless local network, said wireless local network configuration being associated with credentials for using said wireless local network,
- associating at least one validity parameter to said credentials in order to allow limited accessibility for the vehicle to said wireless local network,
- generating an encrypted visual representation of said credentials, thereby enabling the generated encrypted visual representation to be presented to a camera of the vehicle and decrypted to obtain said credentials,
- upon receipt of a connection request including the credentials from the vehicle, checking the at least one validity parameter to determine that the credentials are still valid for the vehicle,
- upon determination that the credentials are still valid, allowing the vehicle to connect to the wireless local network of the workshop.

By the provision of a computer-implemented method which comprises the association of a validity parameter to the credentials, in order to limit the accessibility for the vehicle to the wireless network and by generating an encrypted visual representation of the credentials, a sufficiently secure and yet convenient connecting procedure is achievable between the vehicle and the wireless network. As will be explained in more detail below, there are various possible parameters that may be used as validity parameters. One such parameter may be time. For instance, a time-based validity parameter may be given different values to limit the validity of the credentials for a particular vehicle. As an example, such values may include a certain period of time, such as number of hours or days, or expressed as a range (such as from a starting hour/date to an ending hour/date), etc.

It should furthermore be understood that the validity of the credentials may be individually assigned to different vehicles. Thus, the validity of the same credentials may expire sooner for one vehicle than for another. For example, if two vehicles from the same manufacturer are scheduled to come into the workshop, the workshop may, using the method disclosed herein, generate encrypted visual representations of said credentials with different validity parameter values assigned to the credentials for the two vehicles. However, it is also conceivable to use the same generated encrypted visual representation for the two vehicles, with the same validity parameter values.

The generated encrypted visual representation may suitably be generated in a control unit such as a computer of the workshop, and may suitably be forwarded to a hand-held device such as a cell phone, a tablet or other tool provided with a screen, in which case it will be shown as an image. However, the visual representation may also be printed, e.g., on a piece of paper. According to at least some exemplary embodiments, a hand-held device may generate the encrypted visual representation. In such cases the actual generation does not need to go through a software on a computer of the workshop.

The generated encrypted visual representation may suitably be a barcode, such as a two-dimensional or matrix barcode. For instance, the generated encrypted visual representation may suitably be a QR code, in particular a shuffled QR code.

The various steps of the computer-implemented method may suitably be performed by a computer, server, or any suitable local control unit at the workshop. Such a local control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The wireless local network may for example be a Wi-Fi network, but the teachings of the present disclosure may also be implemented for other wireless local networks.

The credentials may, for instance, include a certificate, a token or a password/passcode. Generally, a certificate is considered to offer a higher level of security.

As mentioned previously, the validity parameter may, for instance, be time-based. This is reflected in at least one exemplary embodiment. Thus, according to at least one exemplary embodiment, the at least one validity parameter comprises a time-based validity parameter, setting the validity of the credentials for the vehicle to a limited period of time. As mentioned above, the limited period of time, may be set as an absolute number such as expressed in hours or days, or it may be expressed as a range, for example the credentials being valid from a starting to a stopping time/date. Thus, when the vehicle has received the credentials, by reading the generated encrypted visual representation with a camera of the vehicle and decrypting it, then the vehicle may scan for wireless local networks and when finding the relevant network, the vehicle may send a request including the credentials. If the credentials are still valid the vehicle will be allowed to connect, however, if the credentials have expired or have not yet become valid (the vehicle may have arrived at the wrong date) then the vehicle will be denied wireless access to the workshop.

According to at least one exemplary embodiment, the at least one validity parameter comprises a location-based validity parameter, setting the credentials for the vehicle to be valid on the condition that the vehicle is within a defined area. By setting such a criterion, the connection to the wireless local network may be controlled based on the location of the vehicle. The location-based validity parameter may be designed in various ways. For instance, it may be defined as a maximum distance from a certain point in the workshop, or the location-based validity parameter may include geographical values, such as coordinates or coordinate ranges. For instance, by means of geofencing, it can be established if the vehicle is within the perimeters of the workshop or not, and thus whether or not connection should be allowed. It may also be the case that the validity parameter limits the connection to certain locations of the workshop but not to other locations of the workshop.

Although the present disclosure only requires one validity parameter to be associated to said credentials, according to an optional exemplary embodiment, the method comprises associated two or more validity parameters to said credentials, wherein the step of checking the at least one validity parameter comprises checking all validity parameters associated to said credentials to determine that the credentials are still valid for the vehicle. For instance, in such exemplary embodiments, there may be a time-based validity parameter as well as a location-based validity parameter, wherein both are checked for validity to allow and/or maintain connection.

According to at least one exemplary embodiment, the step of associating at least one validity parameter to said credentials, comprises receiving via a user interface one or more parameter values for said at least one validity parameter. This is advantageous as the workshop personnel may, for instance based on the content of the work order, determine suitable values for the validity parameter. For example, the personnel may estimate if the work on the vehicle can be completed in a short time period or a long time period and may set a time-based validity parameter accordingly. The workshop personnel may suitably enter the validity parameter by means of a processing unit with appropriate user interface, such as by means of a computer, tablet or a cell phone. Thus, the user interface may, for example, comprise a touchscreen, a keyboard, a pointing device (mouse) or a combination thereof.

According to at least one exemplary embodiment, the method comprises, when the vehicle is connected to the wireless local network:

- upon determination that the credentials are no longer valid, disconnecting the wireless local network from the vehicle.

Thus, the checking of the validity of the credentials may not only be used at the time when the vehicle is to be connected to the wireless local network, but also subsequently to determine that it may stay connected. According to at least some exemplary embodiments, the credentials may suitably be erased from the vehicle ECU memory after or simultaneously with the disconnection. Such erasing may suitably be automatic.

According to at least one exemplary embodiment, the method comprises, when the vehicle has been connected to the wireless local network, disconnecting the wireless local network from the vehicle:

- upon receipt of an input signal representative of a closing of a repair/service order for the vehicle, or
- when an allowable time limit for the vehicle to use the wireless local network expires, or
- when it is determined that the vehicle moves beyond a defined area.

The last two points may be configured as the previously discussed time-based validity parameter and location-based validity parameter, respectively. However, another possibility for disconnecting the vehicle from the wireless local network may be made by the above mentioned input signal representative of a closing of a repair/service order for the vehicle. Thus, such an input signal may override the determination of whether or not the credentials are still valid, or the input signal may modify the existing validity parameters. When the workshop personnel has completed its work on the vehicle, they can simply enter this via a user interface, which may then automatically trigger the disconnection of the wireless network from the vehicle.

According to at least one exemplary embodiment, said step of generating an encrypted visual representation of said credentials comprises using a public key for generating the encrypted visual representation, which is to be decrypted with a private key after being presented to the camera of the vehicle, the private key being valid for the vehicle. This ensures a secure transferring of the credentials from the workshop to the vehicle. The private key may suitably be a private key of the manufacturer of the vehicle or the owner of the vehicle. In such cases, the private key may suitably be valid for more than one vehicle, such as a set or fleet of vehicles.

According to a second aspect of the present disclosure, there is provided a computer program comprising program code means for performing the steps of the method of the first aspect, including any embodiment thereof, when said program is run on a computer. The advantages of the computer program of the second aspect are largely analogous to the advantages of the method of the first aspect, including any embodiment thereof.

According to a third aspect of the present disclosure, there is provided a computer readable medium carrying a computer program comprising program code means for performing the steps of the method of the first aspect, including any embodiment thereof, when said program product is run on a computer. The advantages of the computer readable medium of the third aspect are largely analogous to the advantages of the method of the first aspect, including any embodiment thereof.

According to a fourth aspect of the present disclosure, there is provided a control unit for controlling the connecting of a vehicle to a wireless local network of a workshop, the control unit being configured to perform the steps of the method of the first aspect, including any embodiment thereof. The advantages of the control unit of the fourth aspect are largely analogous to the advantages of the method of the first aspect, including any embodiment thereof.

According to a fifth aspect of the present disclosure, there is provided a vehicle, comprising:

- a camera configured to scan an encrypted visual representation of credentials associated with a wireless network configuration of a wireless local network of a workshop, when said encrypted visual representation is presented to the camera,
- a vehicle control unit configured to decrypt the encrypted visual representation scanned by the camera to obtain said credentials, and configured to submit the decrypted credentials to the control unit of the fourth aspect for allowing the vehicle to be connected to the wireless local network of the workshop.

The advantages of the vehicle of the of the fifth aspect are largely analogous to the advantages of the method of the first aspect and the control unit of the fourth aspect, including any embodiments thereof.

The camera of the vehicle may, for instance, be a front-looking camera, or a camera from the monitoring system, or a rear camera, or a front corner camera, etc.

The vehicle control unit may include a microprocessor, microcontroller, programmable digital signal processor or another programmable device. The vehicle control unit may also, or instead, include an application specific integrated circuit, a programmable gate array or programmable array logic, a programmable logic device, or a digital signal processor. Where the vehicle control unit includes a programmable device such as the microprocessor, microcontroller or programmable digital signal processor mentioned above, the processor may further include computer executable code that controls operation of the programmable device.

Generally, all terms used in the claims are to be interpreted according to their ordinary meaning in the technical field, unless explicitly defined otherwise herein. All references to "a/an/the element, apparatus, component, arrangement, device, means, step, etc." are to be interpreted openly as referring to at least one instance of the element, apparatus, component, arrangement, device, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
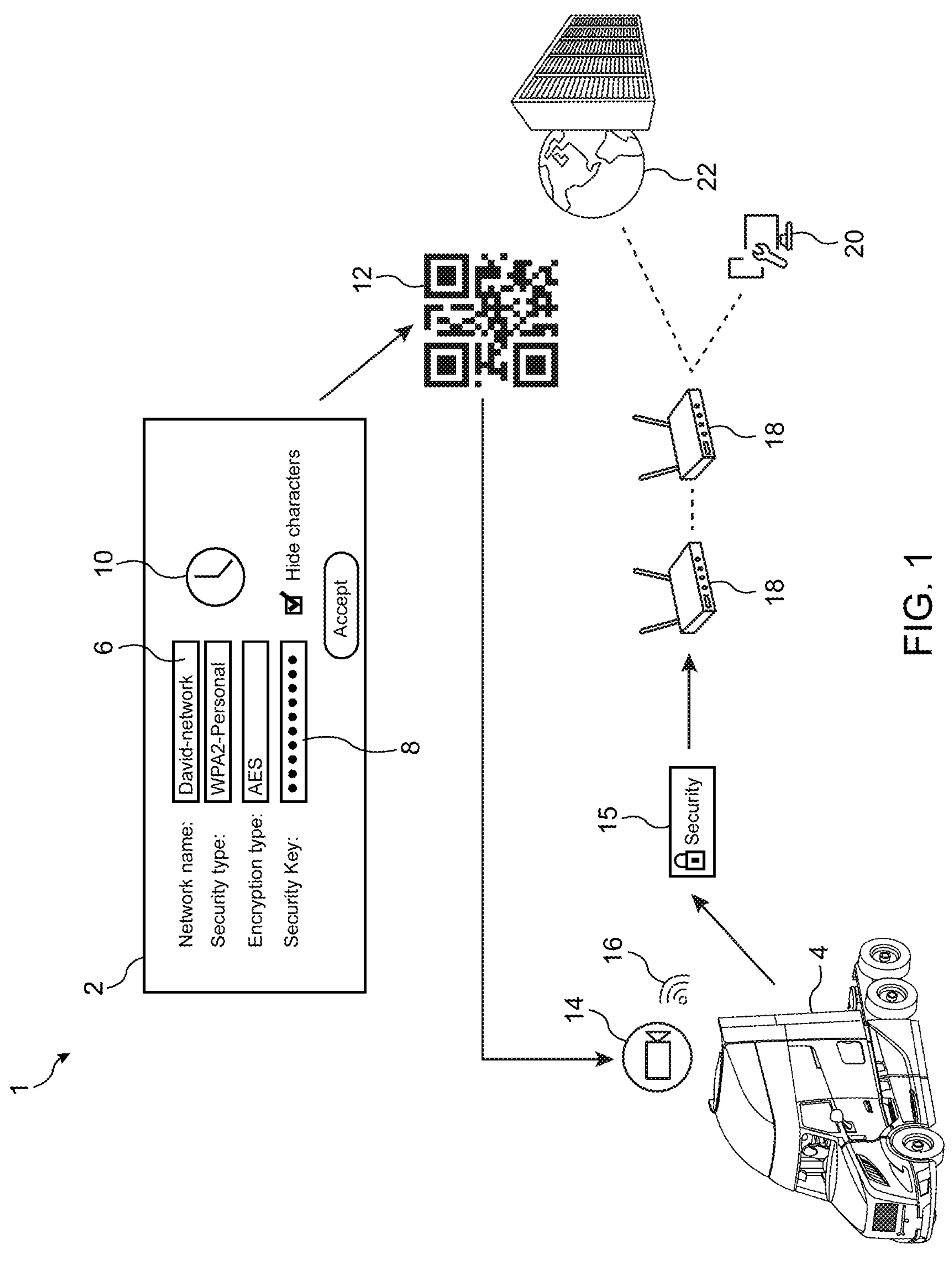
FIG. 1 is a general overview of a method according to at least one exemplary embodiment of the present disclosure.

The various embodiments will now be described more fully hereinafter with reference to the accompanying drawings, in which certain aspects of the embodiments are shown. The claims may, however, be embodied in many different forms and should not be construed as limited to the embodiments and aspects set forth herein; rather, the embodiments are provided by way of example so that this disclosure will be thorough and complete, and will fully convey the scope of the present disclosure to those skilled in the art. Accordingly, it is to be understood that the skilled person will recognize that many changes and modifications may be made within the scope of the appended claims. Like reference numerals refer to like elements throughout the description.

FIG. 1 is a general overview of a computer-implemented method 1 according to at least one exemplary embodiment of the present disclosure. In FIG. 1 a screenshot is shown. This may represent a computer 2 of a workshop. In FIG. 1 there is also shown a vehicle 4 which will undergo repair, diagnosis, service, or some other work at the workshop. The vehicle 4 is here represented by a heavy-duty vehicle in the form of a truck, however, the general inventive concept may be implemented for other types of vehicles as well.

The computer 2 of the workshop may be a personal computer (PC) such as in a reception of the workshop, or as part of a diagnostic tool, or in the form of any other suitable control unit. The computer 2 comprises a software which may include at least one wireless local network configuration. Suitably, there may be a list of wireless local network configurations as shown in the screenshot. In case there is a list, e.g., a list of Wi-Fi SSIDs, they may be presented in an order of priority. Thus, the computer 2 identifies at least one wireless local network configuration 6, which is readable by the workshop personnel. The at least one wireless local network configuration 6 is associated with credentials 8 for using the wireless local network. The credentials 8 may for example comprise a password or be based on a certificate. Such a certificate may be downloaded through the workshop software.

The computer 2 is configured to associate at least one validity parameter 10 to said credentials 8 in order to allow limited accessibility for the vehicle 4 to be connected to the wireless network. The computer 2 may receive a value of such a validity parameter 10 from the workshop personnel. The validity parameter 10 may, for example be a time-based validity parameter which defines the conditions on which the vehicle 4 may initiate the connection and stay connected to the wireless local network. It may, for example, be a date range. Another validity parameter 10 may be location-based, in which the location of the vehicle 4 should be at or within a defined location/area. Such different conditions may also be combinable, requiring each condition to be fulfilled. The personnel may also enter for which vehicle or vehicles the credentials 8 are intended. Different validity parameters 10 and/or different validity parameter values may be chosen for different vehicles.

After the association of the at least one validity parameter 10 has been done, the computer 2 generates an encrypted visual representation 12 of said credentials, here illustrated as a shuffled QR code. The generation of the encrypted visual representation 12 may suitably be achieved with a public key, such as a public key of the vehicle dealer/owner/manufacturer. The generated encrypted visual representation 12 may be printed or shown as an image on a cell phone (or other device provided with a screen) to the vehicle 4. Furthermore, the generated encrypted visual representation 12 may be used for one or several to set the vehicle wireless communications interface, and to for example set an expiration date.

The vehicle is equipped with a camera 14. The reading of the generated encrypted visual representation 12 may be read by the camera 14. The camera 14 may, for instance, be a front looking camera, or one of the cameras of the monitoring system of the vehicle 4, or a rear camera, or a front corner camera. The camera 14 is operatively connected to a vehicle control unit of the vehicle 4, and the vehicle control unit is configured to decrypt the encrypted visual representation read by the camera to obtain said credentials 8. The vehicle control unit may suitably use a private key to decrypt 15 the read encrypted visual representation 12. In this way the provision of the credentials 8 to the vehicle 4 may be achieved in a secured manner with authentication. If the encrypted visual representation 12 is valid, the vehicle control unit will set the wireless communications interface of the vehicle 4. The wireless communications interface may, for example, be a Wi-Fi interface 16.

By means of the Wi-Fi interface 16, the vehicle 4 may detect several wireless local network configurations that match with the ones in the configured list. The vehicle 4 might also detect a single wireless local network configuration 6 which is accessible via one or more access points 18 spread around the workshop. To select the proper one, the vehicle 4 may connect to the one with the highest signal strength. It may, additionally or alternatively, follow an order of priority defined in the configuration list. In case the vehicle 4 moves within the workshop it may apply such a connection procedure several times using a threshold (e.g., signal strength or available bandwidth) to determine when to leave an access point 18 and connect to another one.

Upon receipt of a connection request including the decrypted credentials 8 from the vehicle 4 (such as from its vehicle control unit), the computer 2 will check the at least one validity parameter 10 to determine that the credentials 8 are still valid for the vehicle 4. Upon determination that the credentials 8 are still valid, the vehicle 4 will be allowed to connect to the wireless local network of the workshop. In case the vehicle 4 faces problems connecting, it is possible to request relaunch of the connection. In case the vehicle 4 becomes disconnected due to invalid validity parameter (e.g., the time for repairing the vehicle 4 takes longer than what was initially expected when setting a time-based validity parameter 10), then it may also be possible to request such a relaunch.

Once the connection between the vehicle 4 and the wireless local network of the workshop has been established, the wireless local network may allow traffic between the vehicle 4, a diagnostic tool 20 and servers on the Internet 22.

Although not illustrated in FIG. 1, the status of the vehicle's connection may suitably be monitored. For enabling a good follow-up of the vehicle 4, it may be possible to get a status from the vehicle 4 if it is connected and to which wireless local network and display the status in a corresponding network configuration tool in the software of the workshop. The status information can be provided on the workshop IT network or via telematics. For some status information, such as the issue of connecting/reconnecting, it may run via telematics before reaching the software of the workshop tool.

Figure 2:
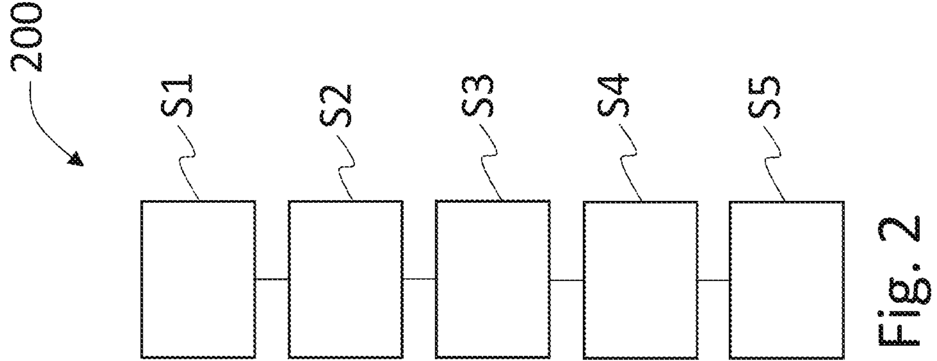
FIG. 2 is a schematic illustration of a method according to at least one exemplary embodiment of the present disclosure.

FIG. 2 is a schematic illustration of a method 200 according to at least one exemplary embodiment of the present disclosure. More particularly, it illustrates a computer-implemented method 200 for connecting a vehicle to a wireless local network of a workshop, comprising:

- in a step S1, identifying at least one wireless local network configuration of the wireless local network, said wireless local network configuration being associated with credentials for using said wireless local network,
- in a step S2, associating at least one validity parameter to said credentials in order to allow limited accessibility for the vehicle to said wireless local network,
- in a step S3, generating an encrypted visual representation of said credentials, thereby enabling the generated encrypted visual representation to be presented to a camera of the vehicle and decrypted to obtain said credentials,
- in a step S4, upon receipt of a connection request including the credentials from the vehicle, checking the at least one validity parameter to determine that the credentials are still valid for the vehicle,
- in a step S5, upon determination that the credentials are still valid, allowing the vehicle to connect to the wireless local network of the workshop.

Figure 3:
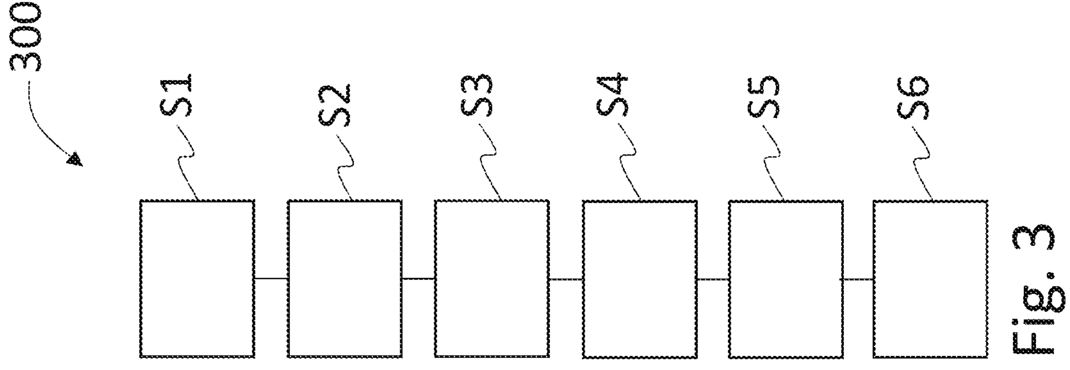
FIG. 3 is a schematic illustration of a method according to at least another exemplary embodiment of the present disclosure.

FIG. 3 is a schematic illustration of a method 300 according to at least a further exemplary embodiment of the present disclosure. The method 300 comprises all the steps of the method 200 in FIG. 2, and further comprises, when the vehicle has been connected to the wireless local network, in a step S6, disconnecting the wireless local network from the vehicle:

- upon receipt of an input signal representative of a closing of a repair/service order for the vehicle, or when an allowable time limit for the vehicle to use the wireless local network expires, or when it is determined that the vehicle moves beyond a defined area.

In at least some exemplary embodiments, step S6 may simply be, upon determination that the credentials are no longer valid, disconnecting the wireless local network from the vehicle.

Figures 4, 5:
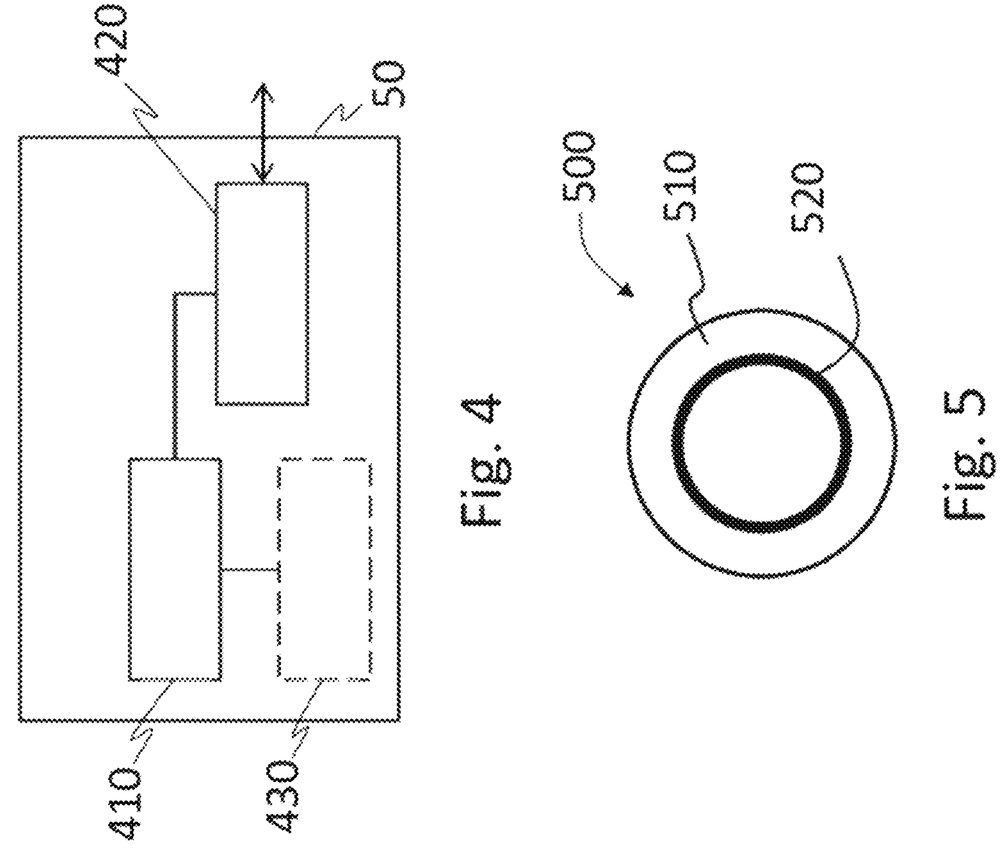
FIG. 4 schematically illustrates a control unit according to at least one exemplary embodiment of the present disclosure.
FIG. 5 schematically illustrates a computer program product according to at least one exemplary embodiment of the present disclosure.

FIG. 4 schematically illustrates a control unit 50 according to at least one exemplary embodiment of the invention. In particular, FIG. 4 illustrates, in terms of a number of functional units, the components of a control unit 50 according to exemplary embodiments of the discussions herein. The control unit 50 may comprise or be comprised in a computer or the like, such as a computer discussed in connection with FIG. 1. Processing circuitry 410 may be provided using any combination of one or more of a suitable central processing unit CPU, multiprocessor, microcontroller, digital signal processor DSP, etc., capable of executing software instructions stored in a computer program product, e.g., in the form of a storage medium 430. The processing circuitry 410 may further be provided as at least one application specific integrated circuit ASIC, or field programmable gate array FPGA.

Particularly, the processing circuitry 410 is configured to cause the control unit 50 to perform a set of operations, or steps, such as the methods discussed above in connection to FIGS. 2-3. For example, the storage medium 430 may store the set of operations, and the processing circuitry 410 may be configured to retrieve the set of operations from the storage medium 430 to cause the control unit 50 to perform the set of operations. The set of operations may be provided as a set of executable instructions. Thus, the processing circuitry 410 is thereby arranged to execute exemplary methods as herein disclosed.

The storage medium 430 may also comprise persistent storage, which, for example may be any single one or combination of magnetic memory, optical memory, solid state memory or even remotely mounted memory.

The control unit 50 may further comprise an interface 420 for communications with at least one external device such as a keyboard, monitor, routers, external servers, etc. As such, the interface 420 may comprise one or more transmitters and receivers, comprising analogue and digital components and a suitable number of ports for wireline or wireless communication.

The processing circuitry 410 controls the general operation of the control unit 50, e.g., by sending data and control signals to the interface 420 and the storage medium 430, by receiving data and reports from the interface 420, and by retrieving data and instructions from the storage medium 430. Other components, as well as the related functionality, of the control unit 50 are omitted in order not to obscure the concepts presented herein.

FIG. 5 schematically illustrates a computer program product 500 according to at least one exemplary embodiment of the invention. More specifically, FIG. 5 illustrates a computer readable medium 510 carrying a computer program comprising program code means 520 for performing the methods exemplified in FIGS. 2-3, when said program product is run on a computer. The computer readable medium 510 and the program code means 520 may together form the computer program product 500.

The invention claimed is:

1. A computer-implemented method for connecting a vehicle to a wireless local network of a workshop, comprising:

identifying at least one wireless local network configuration of the wireless local network, said wireless local network configuration being associated with credentials for using said wireless local network;

associating at least one validity parameter to said credentials in order to allow limited accessibility for the vehicle to said wireless local network;

generating an encrypted visual representation of said credentials comprising encrypting the credentials using a key and encoding the encrypted credentials into a visual format, thereby enabling the generated encrypted visual representation to be presented to a camera of the vehicle and decrypted using the corresponding key to obtain said credentials;

upon receipt of a connection request including the decrypted credentials from the vehicle, checking the at least one validity parameter to determine that the credentials are still valid for the vehicle; and upon determination that the credentials are still valid, allowing the vehicle to connect to the wireless local network of the workshop.

2. The method according to claim 1 wherein the at least one validity parameter comprises a time-based validity parameter, setting the validity of the credentials for the vehicle to a limited period of time.

3. The method according to claim 1, wherein the at least one validity parameter comprises a location-based validity parameter, setting the credentials for the vehicle to be valid on the condition that the vehicle is within a defined area.

4. The method according to claim 1, further comprising associating two or more validity parameters to said credentials, wherein the step of checking the at least one validity parameter comprises checking all validity parameters associated to said credentials to determine that the credentials are still valid for the vehicle.

5. The method according to claim 1, wherein the step of associating at least one validity parameter to said credentials, comprises receiving via a user interface one or more parameter values for said at least one validity parameter.

6. The method according to claim 1, further comprising, when the vehicle is connected to the wireless local network:

upon determination that the credentials are no longer valid, disconnecting the wireless local network from the vehicle.

7. The method according to claim 1, further comprising, when the vehicle has been connected to the wireless local network, disconnecting the wireless local network from the vehicle:

upon receipt of an input signal representative of a closing of a repair/service order for the vehicle, or when an allowable time limit for the vehicle to use the wireless local network expires, or when it is determined that the vehicle moves beyond a defined area.

8. The method according to claim 1, wherein said step of generating an encrypted visual representation of said credentials comprises using a public key for generating the encrypted visual representation, which is to be decrypted with a private key after being presented to the camera of the vehicle, the private key being valid for the vehicle.

9. A vehicle, comprising:

a camera configured to scan an encrypted visual representation of credentials associated with a wireless network configuration of a wireless local network of a workshop, the encrypted visual representation being encoded into a visual format, when said encrypted visual representation is presented to the camera; and a vehicle control unit configured to:

decrypt the encrypted visual representation scanned by the camera using a key corresponding to the encrypted visual representation to obtain said credentials; and submit the decrypted credentials to a control unit for allowing the vehicle to be connected to the wireless local network of the workshop.

10. A control unit for controlling the connecting of a vehicle to a wireless local network of a workshop, the control unit configured to:

identify at least one wireless local network configuration of the wireless local network, said wireless local network configuration being associated with credentials for using said wireless local network;

associate at least one validity parameter to said credentials in order to allow limited accessibility for the vehicle to said wireless local network;

generate an encrypted visual representation of said credentials comprising encrypting the credentials using a key and encoding the encrypted credentials into a visual format, thereby enabling the generated encrypted visual representation to be presented to a camera of the vehicle and decrypted using the corresponding key to obtain said credentials;

upon receipt of a connection request including the decrypted credentials from the vehicle, check the at least one validity parameter to determine that the credentials are still valid for the vehicle; and upon determination that the credentials are still valid, allow the vehicle to connect to the wireless local network of the workshop.

11. The control unit according to claim 10 wherein the at least one validity parameter comprises a time-based validity parameter, setting the validity of the credentials for the vehicle to a limited period of time.

12. The control unit according to claim 10, wherein the at least one validity parameter comprises a location-based validity parameter, setting the credentials for the vehicle to be valid on the condition that the vehicle is within a defined area.

13. The control unit according to claim 10, wherein the control unit is further configured to associate two or more validity parameters to said credentials, wherein checking the at least one validity parameter comprises checking all validity parameters associated to said credentials to determine that the credentials are still valid for the vehicle.

14. The control unit according to claim 10, wherein the step of associating at least one validity parameter to said credentials comprises receiving via a user interface one or more parameter values for said at least one validity parameter.

15. The control unit according to claim 10, wherein the control unit is further configured to when the vehicle is connected to the wireless local network:

upon determination that the credentials are no longer valid, disconnect the wireless local network from the vehicle.

16. The control unit according to claim 10, wherein the control unit is further configured to when the vehicle has been connected to the wireless local network, disconnect the wireless local network from the vehicle:

upon receipt of an input signal representative of a closing of a repair/service order for the vehicle, or when an allowable time limit for the vehicle to use the wireless local network expires, or when it is determined that the vehicle moves beyond a defined area.

17. The control unit according to claim 10, wherein generating the encrypted visual representation of the credentials comprises using a public key for generating the encrypted visual representation, which is to be decrypted with a private key after being presented to the camera of the vehicle, the private key being valid for the vehicle.

* * * * *